US009751199B2

(12) United States Patent
Andrews

(10) Patent No.: US 9,751,199 B2
(45) Date of Patent: Sep. 5, 2017

(54) DISK BRAKE WHEEL STUD INSERTION AND REMOVAL TOOL

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 14/616,693

(22) Filed: Feb. 7, 2015

(65) Prior Publication Data

US 2015/0224635 A1 Aug. 13, 2015

Related U.S. Application Data

(60) Provisional application No. 61/938,006, filed on Feb. 10, 2014.

(51) Int. Cl.

| | |
|---|---|
| ***B23P 19/04*** | (2006.01) |
| ***B25B 27/00*** | (2006.01) |
| ***B25B 27/02*** | (2006.01) |
| ***B25B 27/04*** | (2006.01) |

(52) U.S. Cl.
CPC ........ *B25B 27/0035* (2013.01); *B25B 27/023* (2013.01); *B25B 27/026* (2013.01); *B25B 27/04* (2013.01); *Y10T 29/49822* (2015.01); *Y10T 29/53826* (2015.01)

(58) Field of Classification Search
CPC ......... B25B 5/067; B25B 5/082; B25B 5/101; B25B 5/125; B25B 28/00
See application file for complete search history.

(56) References Cited

U.S. PATENT DOCUMENTS

| | | | |
|---|---|---|---|
| 569,527 | A | 10/1896 | Tilton |
| 1,857,211 | A | 5/1932 | Odlum et al. |
| 2,036,782 | A | 4/1936 | Ullmo |
| 2,052,534 | A | 8/1936 | Quarles |
| 2,484,129 | A | 10/1949 | Taylor |
| 2,549,429 | A | 4/1951 | Cowles |
| 2,798,392 | A | 7/1957 | Randolph |
| 3,102,333 | A | 9/1963 | Thornton et al. |
| 3,200,483 | A | 8/1965 | Menegoni |

(Continued)

OTHER PUBLICATIONS

OTC, "Wheel Stud Remover/Installer," Product Brochure, 2009, 1 page, Product No. 5195.

(Continued)

*Primary Examiner* — Lee D Wilson
(74) *Attorney, Agent, or Firm* — Michael R. Schacht; Schacht Law Office, Inc.

(57) ABSTRACT

A wheel stud press assembly for displacing a wheel stud relative to a wheel opening in a wheel flange comprising a frame assembly and a drive system. The frame assembly defines first and second arm portions and a drive axis. The drive axis extends between the first and second arm portions. The drive system comprising a drive rod and is supported by the frame assembly to displace the drive rod along the drive axis. When the drive rod engages the wheel stud and the first and second arm portions engage the wheel flange, operation of the drive system forces the wheel stud out of the wheel opening between the first and second arm portions.

25 Claims, 9 Drawing Sheets

(56) References Cited

U.S. PATENT DOCUMENTS 3,237,291 A 3/1966 Kelso
3,742,570 A 7/1973 Felser
3,862,483 A 1/1975 Kloster
4,363,475 A * 12/1982 McCarty ................. B25B 5/006 269/101
4,398,706 A 8/1983 Kaulfuss
4,624,039 A 11/1986 Lawrence et al.
4,648,166 A 3/1987 Tilman
4,672,731 A 6/1987 Taylor
4,765,057 A 8/1988 Muller
4,770,401 A * 9/1988 Donaldson ................ B25B 1/18 269/225
4,771,528 A 9/1988 Stromberg
4,867,366 A 9/1989 Kleinholz
4,940,370 A 7/1990 Gipson
4,976,280 A 12/1990 Lagana
5,125,324 A * 6/1992 Araki ...................... B25B 27/10 269/238
5,210,919 A 5/1993 Garman
5,211,211 A 5/1993 Rubino et al.
5,233,741 A 8/1993 Maynard
5,257,445 A 11/1993 Mayberry
5,271,136 A 12/1993 Skoworodko
5,519,929 A 5/1996 Bleckman
5,586,378 A 12/1996 Smith
5,606,788 A 3/1997 Rubino et al.
5,692,437 A 12/1997 Tabain
5,839,180 A 11/1998 Hochmiller
5,898,985 A 5/1999 Villarreal
6,192,566 B1 2/2001 Dunum
6,505,390 B2 1/2003 Emanuel
6,618,920 B1 9/2003 Emanuel
6,789,791 B2 9/2004 Genduso
7,020,944 B2 4/2006 Klann
7,093,809 B2 8/2006 Hwang
7,219,885 B2 * 5/2007 Nardozza ................ B25B 5/102 269/166
7,387,296 B2 * 6/2008 Alberti .................... B25B 5/067 269/143
7,818,860 B2 10/2010 Hume et al.
8,689,420 B2 * 4/2014 Barrios ............... B25B 27/0035 269/249
2003/0084555 A1 5/2003 Meggiolan
2003/0106197 A1 6/2003 Emanuel
2005/0071973 A1 4/2005 Emanuel
2006/0070221 A1 4/2006 Wridt et al.
2008/0289841 A1 11/2008 Kang
2009/0025514 A1 1/2009 Barrios et al.
2010/0000749 A1 1/2010 Andel
2010/0236039 A1 9/2010 Robledo
2011/0048649 A1 3/2011 Komatsu et al.
2011/0094076 A1 4/2011 Liu
2011/0219617 A1 * 9/2011 Barrios ............... B25B 27/0035 29/894.3
2013/0026692 A1 * 1/2013 Prins ....................... B25B 5/101 269/249
2014/0366954 A1 12/2014 Miller et al.
2015/0183268 A1 7/2015 Baldassara et al.

OTHER PUBLICATIONS

OTC, "Wheel Stud Service Kit," Product Brochure, 2012, 1 page, Product No. 4295.
Toyota, "4Runner Repair Manual, Inspection and Repair of Front Axle Hub" 1990, pp. 1 and SA-18, vol. 2, Publication No. RM143U2.

* cited by examiner

DISK BRAKE WHEEL STUD INSERTION AND REMOVAL TOOL

RELATED APPLICATIONS

This application, U.S. patent application Ser. No. 14/616,693 filed Feb. 7, 2015 claims benefit of U.S. Provisional Application Ser. No. 61/938,006 filed Feb. 10, 2014, the contents of which are incorporated herein by reference.

TECHNICAL FIELD

The present invention relates to systems and methods for removing the wheel studs from a wheel.

BACKGROUND

During repair and maintenance of a wheel assembly, wheel studs may need to be removed from stud openings in a wheel flange and then replaced.

The need exists for improved systems and methods of removing the wheel studs from a wheel and replacing the wheel studs.

SUMMARY

The present invention may be embodied as a wheel stud press assembly for displacing a wheel stud relative to a wheel opening in a wheel flange comprising a frame assembly and a drive system. The frame assembly defines first and second arm portions and a drive axis. The drive axis extends between the first and second arm portions. The drive system comprises a drive rod and is supported by the frame assembly to displace the drive rod along the drive axis. When the drive rod engages the wheel stud and the first and second arm portions engage the wheel flange, operation of the drive system forces the wheel stud out of the wheel opening between the first and second arm portions.

The present invention may also be embodied as a method of displacing a wheel stud relative to a wheel opening in a wheel flange comprising the following steps. A frame assembly defining first and second arm portions and a drive axis is provided. The drive axis extends between the first and second arm portions. A drive system comprising a drive rod is provided. The drive system is supported with the frame assembly such that the drive rod is movable along the drive axis. The drive rod is engaged with the wheel stud. The first and second arm portions are engaged with the wheel flange. The drive system is operated to displace the drive rod along the drive axis and thereby force the wheel stud out of the wheel opening between the first and second arm portions.

The present invention may also be embodied as a wheel stud press assembly for displacing a wheel stud relative to a wheel opening in a wheel flange comprising a frame assembly, a drive system, a space plate, and a spacer. The frame assembly defines first and second arm portions and a drive axis. The drive axis extends between the first and second arm portions. The drive system comprises a drive cylinder and a drive rod. The drive cylinder supports the drive rod to define a drive chamber and such that the drive rod is movably between retracted and extended positions relative to the drive cylinder. The drive cylinder is supported by the frame assembly such that the drive rod moves along the drive axis when moved between the retracted and extended positions. Introduction of pressurized fluid into the drive chamber causes the drive rod to move from the retracted position to the extended position along the drive axis. The space plate adapted to extend between the first and second arm portions such that the drive axis extends through the space plate. The spacer adapted to extend around a portion of the wheel stud. When the drive rod engages the wheel stud and the first and second arm portions engage the wheel flange, introduction of pressurized fluid into the drive chamber causes the drive rod to force the wheel stud out of the wheel opening between the first and second arm portions. When the space plate engages the wheel stud and the spacer engages the drive rod and the wheel flange, introduction of pressurized fluid into the drive chamber causes the drive rod to force the wheel stud into the wheel opening.

DETAILED DESCRIPTION

Figure 1:
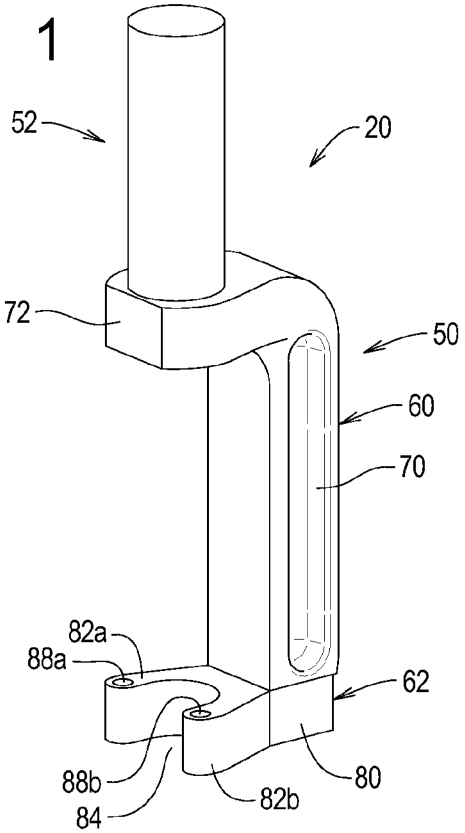
FIG. 1 is a perspective view of a first example wheel stud press assembly for inserting and/or removing the wheel studs from the wheel.

Referring initially to FIG. 1 of the drawing, depicted therein is a first example wheel stud press assembly 20 for use with a wheel assembly 22. The example wheel assembly 22 comprises wheel studs 24 and a wheel 26. The first example wheel stud press assembly 20 may be used in one or more removal configurations to remove the wheel studs 24 from the wheel 26 or in one or more insertion configurations to insert the wheel studs 24 into the wheel 26.

The example wheel assembly 22 is a mining wheel assembly adapted to attach a rim (not shown) supporting a tire (not shown) to a mining truck axle (also not shown). The example wheel assembly 22 is not per se part of the present invention and will be described herein only to that extent necessary for a complete understanding of the present invention. The example wheel assembly 26 comprises a wheel cylinder 30 and a stud flange 32 in which are formed stud openings 34 at evenly spaced intervals, and a disc flange.

Figure 2:
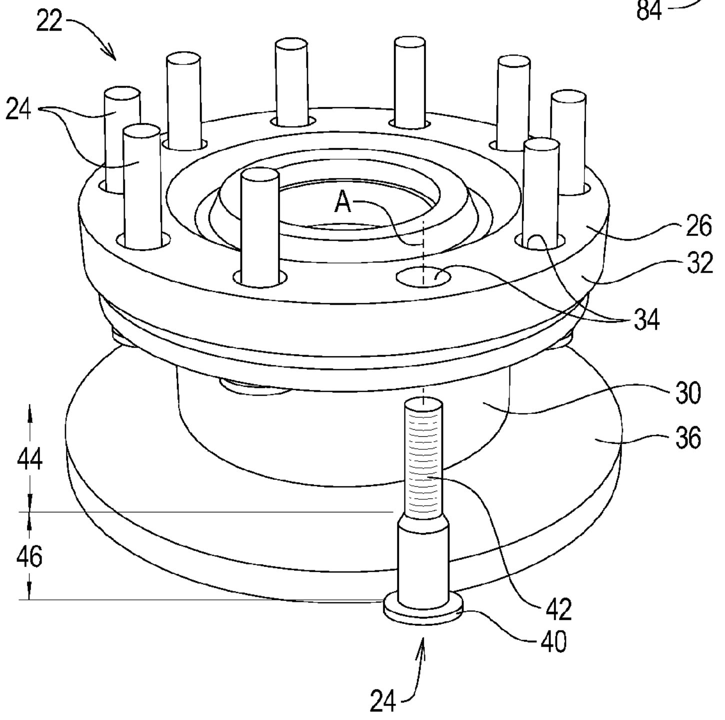
FIG. 2 is a perspective view of an example wheel assembly in connection with which the first example wheel stud press assembly may be used.

In the example wheel assembly 26, the example stud flange 32 and disc flange 36 extend radially outwardly from an exterior surface of the wheel cylinder 30. The example stud flange 32 and disc flange are also longitudinally aligned with the wheel cylinder 30. As shown in FIG. 2, the wheel studs 24 each define a stud axis A and comprise a head 40 and a shaft 42. The shaft 42 defines a shaft threaded portion 44 and a shaft unthreaded portion 46.

The example wheel assembly 22 is of the type commonly used with disc-brake systems. To form the example wheel assembly 22, one of the wheel studs 24 must be driven through each of the stud openings 34 until the unthreaded portion 46 of the shaft 42 engages the portion of the stud flange 32 defining the stud openings 34 to form a friction fit. The wheel studs 24 must be removed and replaced when broken and/or during periodic maintenance of the wheel assembly 22. Removal and replacement of the wheel studs 24 is complicated by the close proximity of the disc flange 36 to the stud flange 32. The first example wheel stud press assembly 20 is designed to improve the process of removing and inserting wheel studs 24 from a wheel 26.

The first example wheel stud press assembly 20 comprises a frame assembly 50 and a first example drive system 52. The example frame assembly 50 is adapted to engage the stud flange 32 while a force is applied on the wheel studs 24 to either insert the wheel studs 24 into or remove the wheel studs 24 from the stud openings 34. The example frame assembly 50 holds the various components of the wheel stud press assembly 20 in position during use of the wheel stud press assembly 20 as will be described herein in detail below.

Figure 3:
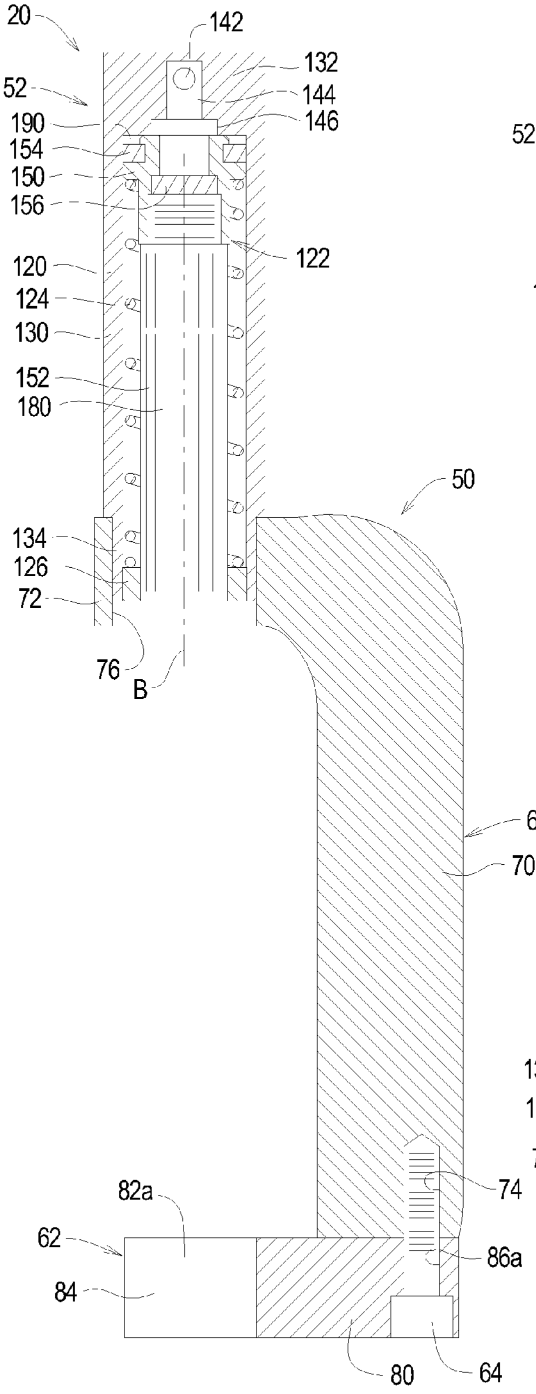
FIG. 3 is a side, partial cut-away view depicting the first example wheel stud press assembly in a retracted configuration.
Figure 3A:
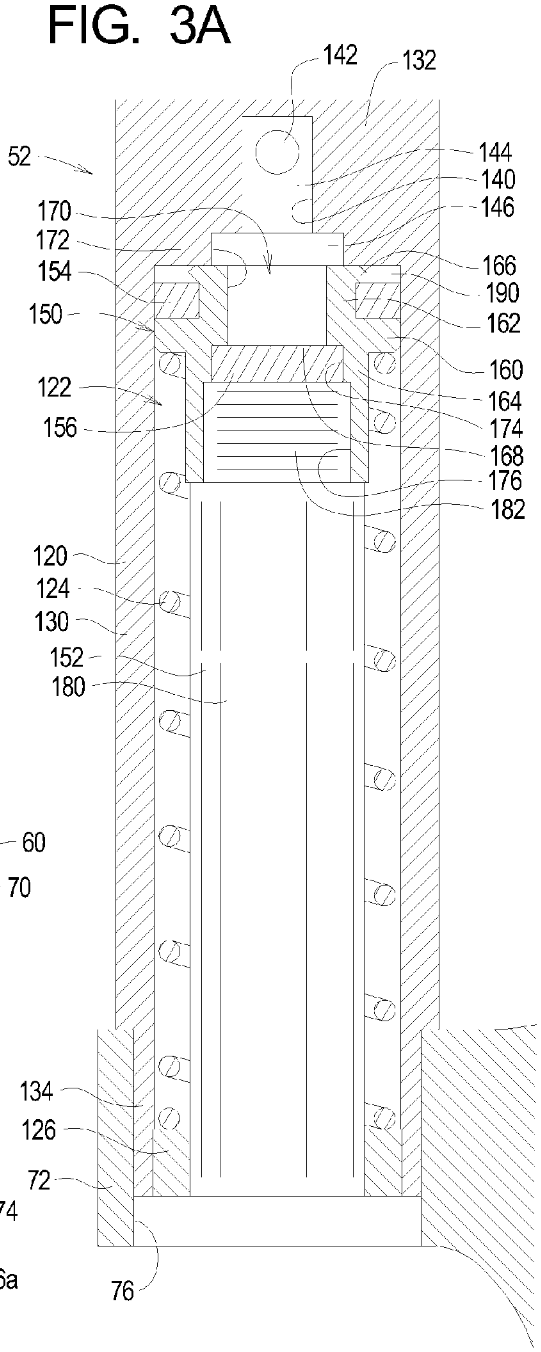
FIG. 3A is an enlarged view of the drive system shown in FIG. 3.
Figure 4:
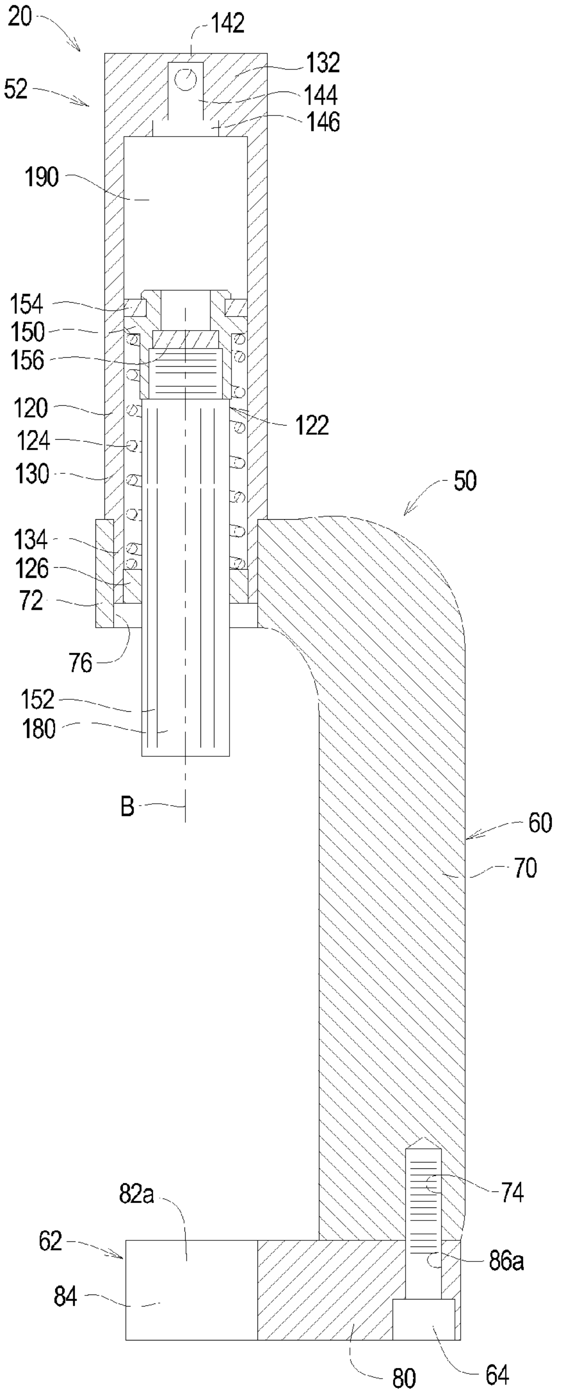
FIG. 4 is a side, partial cut-away view depicting the first example wheel stud press assembly in a partially extended configuration.
Figure 11:
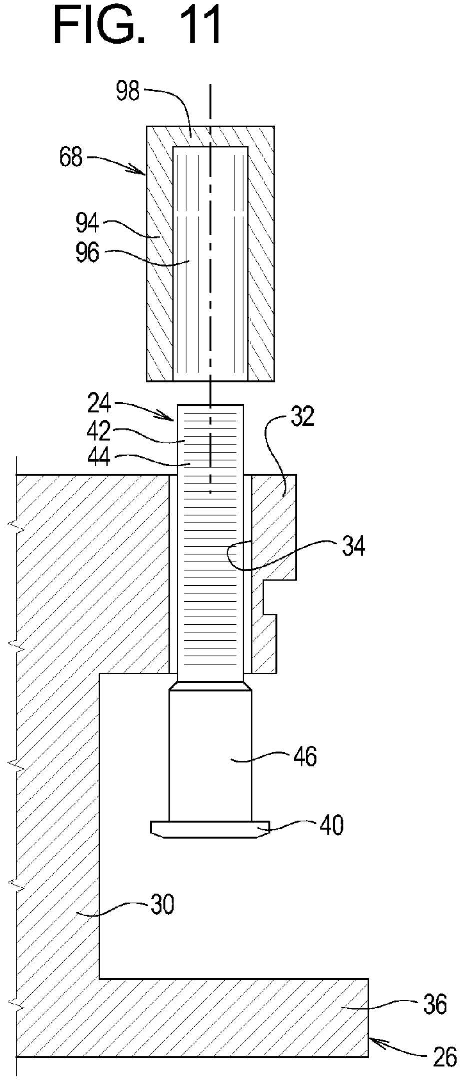
FIGS. 11-13 are side, partial cut-away views depicting the use of the first example wheel stud press assembly to insert a wheel stud.
Figure 12:
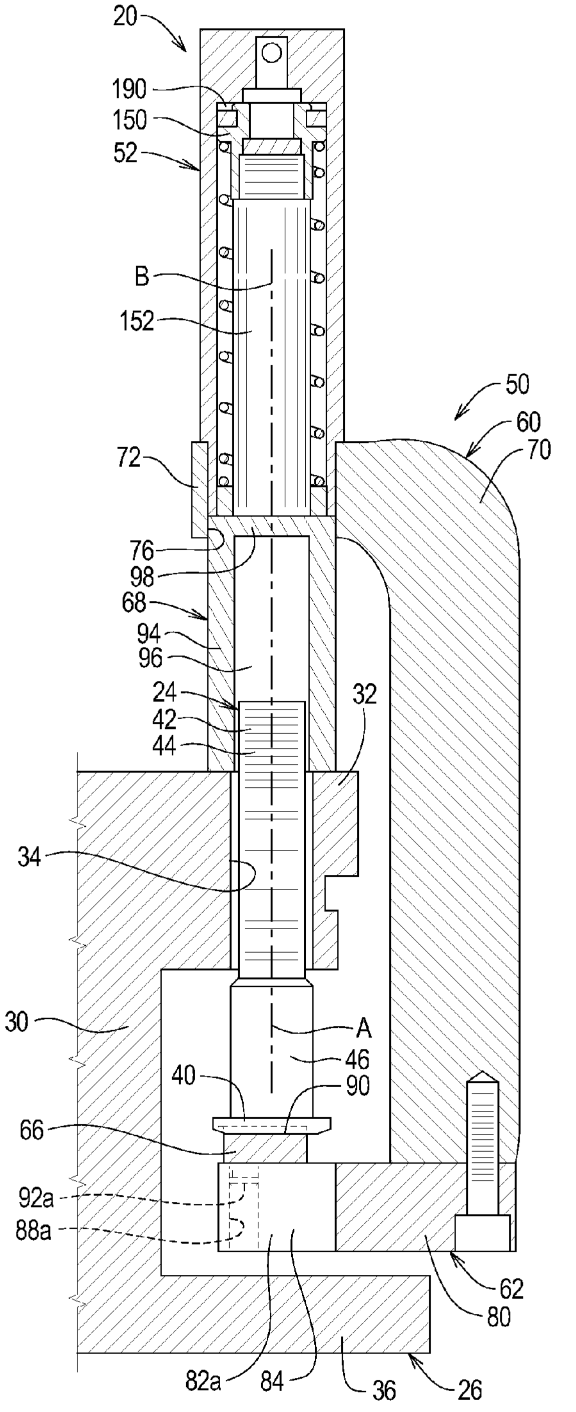
Figure 13:
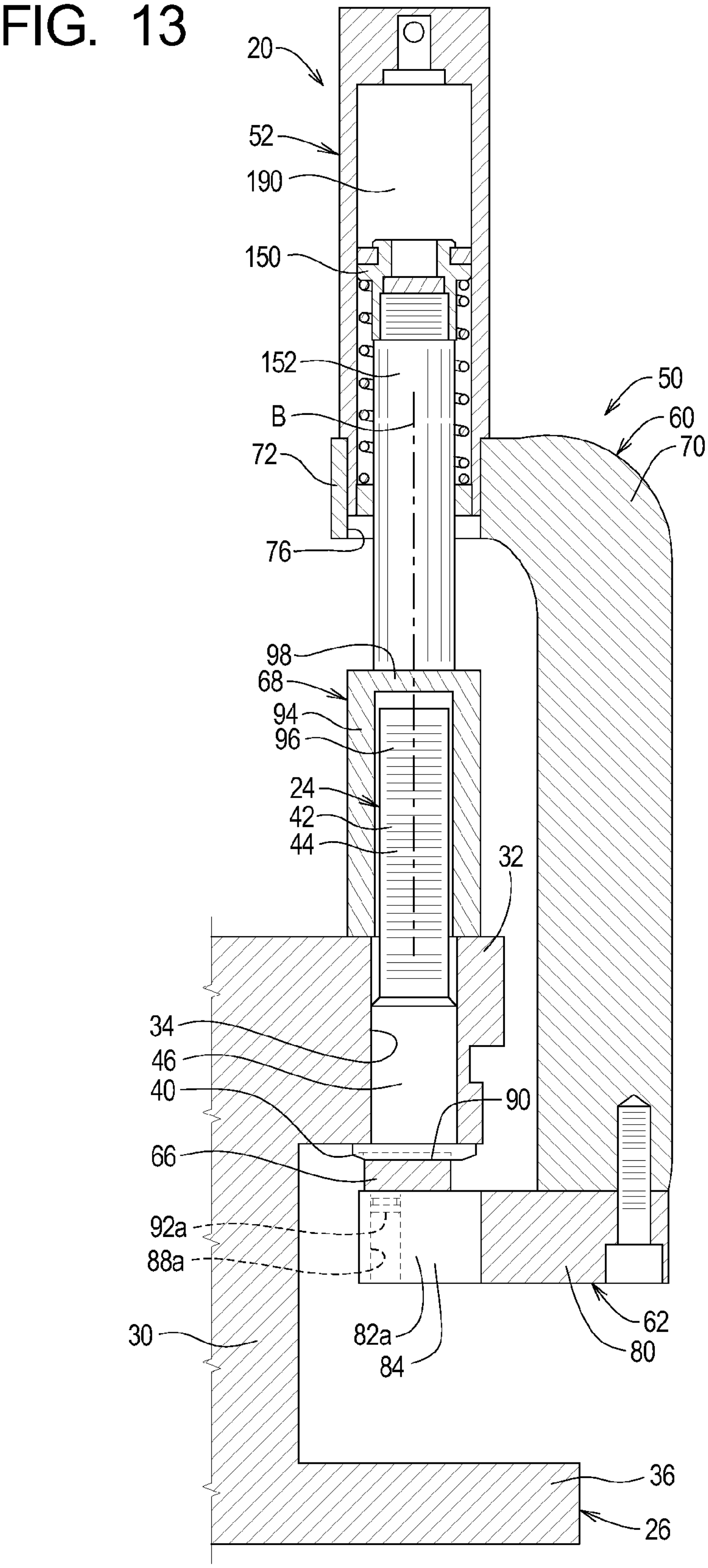

The example frame assembly 50 comprises a frame member 60, an anchor member 62, a plurality of anchor bolts 64 when used to remove a stud 24 as shown in FIGS. 3 and 4. When used to insert rather than remove a stud 24, the first example wheel stud press assembly 20 further comprises a brace plate 66 (FIGS. 9-13), and a spacer 68 (FIGS. 11-13).

The example frame member 60 comprises a main portion 70 and a shoulder portion 72. Anchor cavities 74 are formed in an end of the main portion 70 opposite the shoulder portion 72. A drive hole 76 defining a drive axis B is formed in the shoulder portion 72. The anchor member 62 comprises a base portion 80 and arm portions 82*a* and 82*b* defining a gag 84. Anchor holes 86 are formed in the base portion 80, and brace openings 88*a* and 88*b* are formed in the arm portions 82*a* and 82*b*, respectively.

The example brace plate 66 comprises a stud recess 90 and first and second brace projections 92*a* and 92*b*. The spacer 68 comprises a cylinder 94 defining a spacing chamber 96 and an end wall 98.

To form the frame assembly 50, the anchor bolts 64 are inserted through the anchor holes 86 and threaded into the anchor cavities 74 such that the anchor bolts 64 secure the anchor member 62 in place with the arm portions 82*a* and 82*b* thereof arranged toward and on either side of the drive axis B.

To insert a stud 24, the brace projections 92*a* and 92*b* of the brace plate 66 are arranged within the brace openings 88*a* and 88*b*, respectively, such that the brace plate 66 extends between the arm portions 82*a* and 82*b*. With the brace plate 66 supported between the arm portions 82*a* and 82*b*, the drive axis B extends through the stud recess 90. The spacer 68 is sized and dimensioned such that the end wall 98 thereof extends at least partly within the drive hole 76 at the beginning of the insertion process.

The first example drive system 52 comprises a drive cylinder 120, a piston assembly 122, a return spring 124, and a bearing ring 126. The drive cylinder comprises a side wall 130, a coupler wall 132, and a mounting wall 134. The example side wall 130 takes the form of a hollow tube, and the coupler wall 132 closes one end of the hollow tube formed by the side wall 130. The mounting wall 134 forms an open end of the hollow tube formed by the side wall 130. The coupler wall 132 defines a coupler cavity 140 and a coupler port 142. The coupler cavity 140 defines an inlet portion 144 and an outlet portion 146, and the inlet portion 144 is in communication with the coupler port 142. The outlet portion 146 is in communication with the hollow tube formed by the side wall 130.

The piston assembly 122 comprises a piston cap 150, a piston rod 152, a first piston seal 154, and a second piston seal 156. The piston cap 150 defines a cap base 160, a cap spacing portion 162, and a cap mounting portion 164. A retaining flange 166 extends radially outwardly from the cap spacing portion 162. An internal shoulder 168 is formed on the cap mounting portion 164. The piston cap 150 defines a cap passageway defining a cap chamber portion 172, a seal portion 174, and a rod mounting portion 176. The piston rod 152 comprises a shaft portion 180 and a cap mounting portion 182.

To form the piston assembly 122, the first piston seal 154 is arranged around the cap spacing portion 162 and held in place by the retaining flange 166. The second piston seal 156 is then inserted into the seal portion 174 of the cap passageway 170. The cap mounting portion 182 of the piston rod 152 is then threaded into the rod mounting portion 176 of the cap passageway 170 until the second piston seal 156 is securely held between the cap mounting portion 182 of the piston rod 152 and the internal shoulder 168 of the cap mounting portion 164 of the piston cap 150. At this point, the piston rod 152 is rigidly connected to the piston cap 150.

To form the first example drive system 52, the piston assembly 122 is displaced such that the piston cap 150 is within the hollow tube formed by the side wall 130 of the drive cylinder 120. At this point, a drive chamber 190 is defined by the piston assembly 122 and drive cylinder 120, with the outlet portion 146 of the coupler cavity 140 in fluid communication with the drive chamber 190. The return spring 124 is then inserted into the hollow tube defined by the side wall 130 around the piston rod 152 until the return spring 124 engages the cap base 160 of the piston cap 150. The bearing ring 126 is then inserted into the hollow tube defined by the side wall 130 around the piston rod 152 such that the bearing ring 126 supports the piston assembly 122 for linear movement relative to the drive cylinder 120 along the drive axis B. The piston cap 150 engages the side wall 130 of the drive cylinder 120 to support an interior end of the piston assembly 122 for linear movement relative to the drive cylinder 120 along the drive axis B.

With the drive system 52 so assembled, pressurized fluid such as compressed air may be introduced into the drive chamber 190 through the coupler port 142 and coupler cavity 140. The pressurized fluid acts on the piston cap 150 to force the piston assembly 122 along the drive axis B from a retracted position as shown in FIG. 3 to an extended position as shown in FIG. 4. The coupler port 142 is or may be formed by a conventional quick connect assembly (not shown). The pressurized fluid is or may be provided by a conventional air compressor (not shown). External valves (not shown) may be provided to control the flow of air into and out of the coupler port 142. When pressurized fluid is no longer allowed to flow through the coupler port 142, the return spring 124 will force the piston assembly 122 back into the retracted position.

Figure 5:
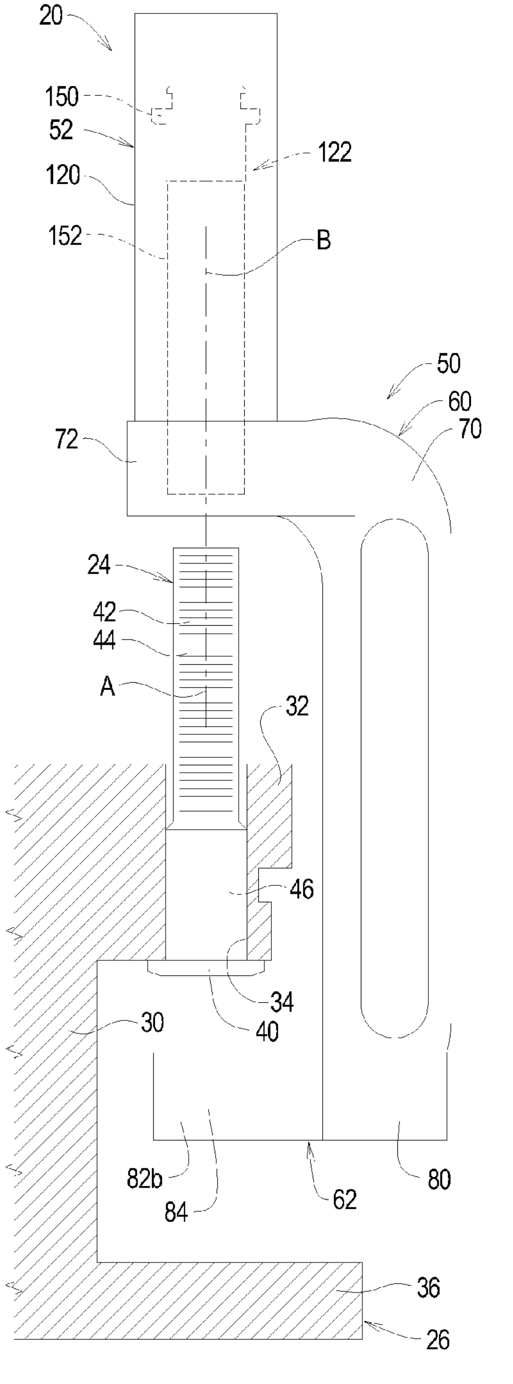
FIGS. 5-7 are side, partial cut-away views depicting the use of the first example wheel stud press assembly to remove a wheel stud.
Figure 6:
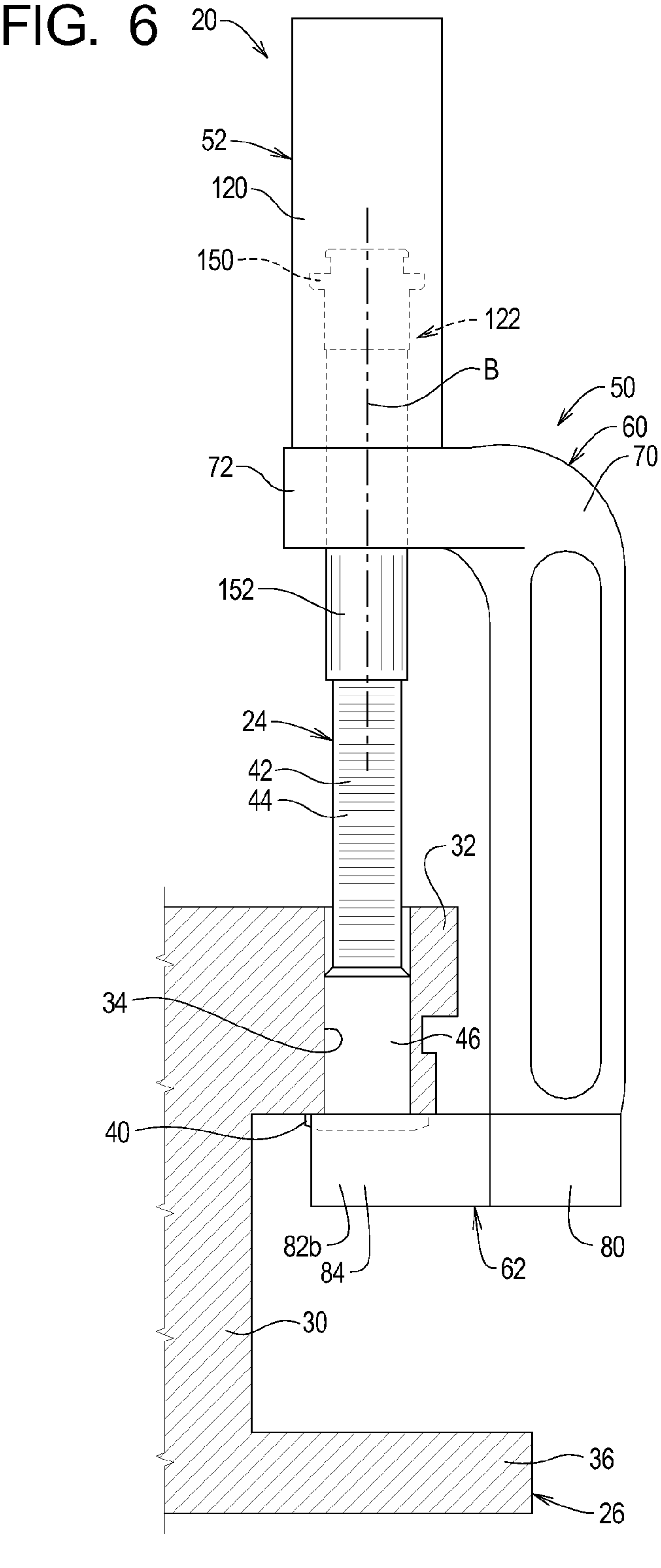
Figure 7:
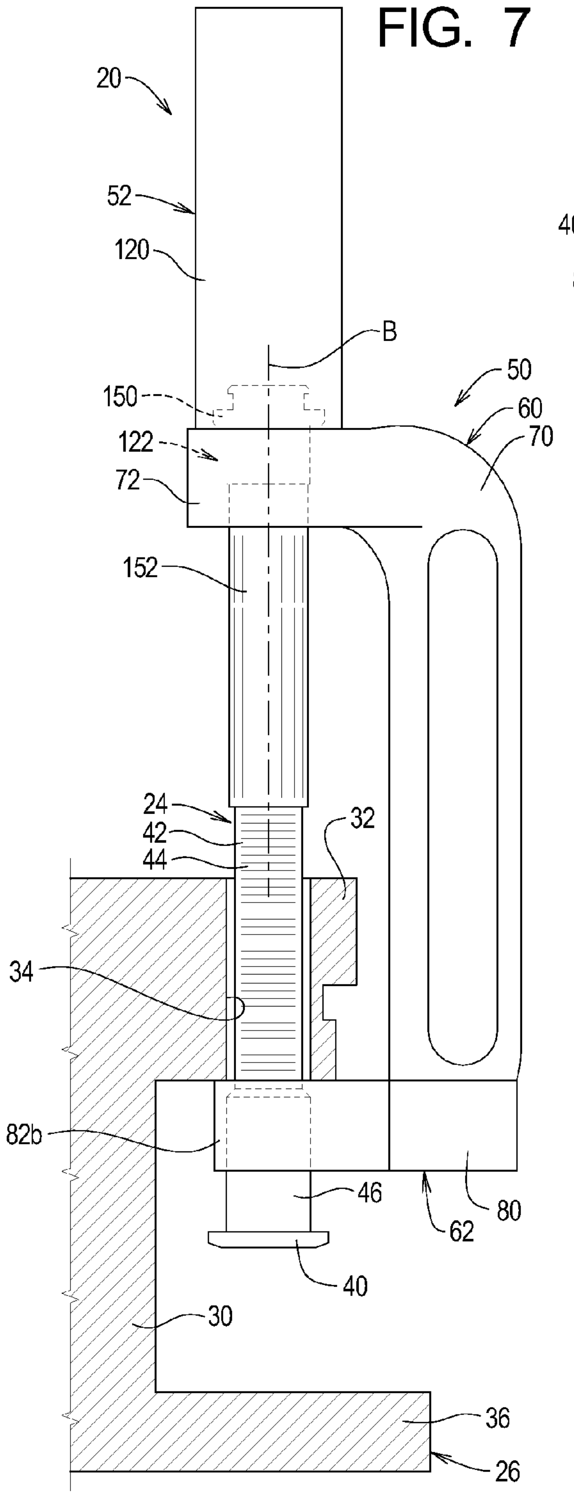
Figure 8:
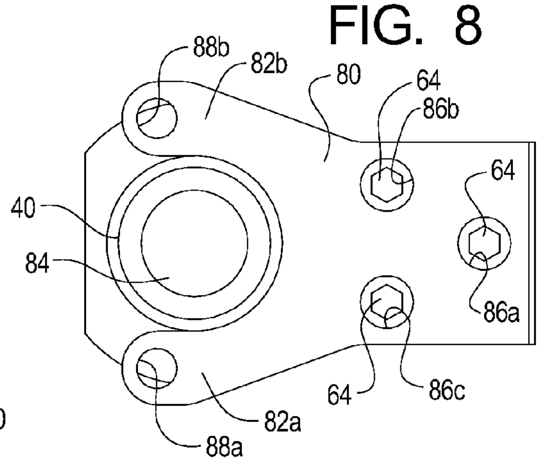
FIG. 8 is a bottom plan view of the first example wheel stud press assembly.

When used to remove a wheel stud 24, the wheel stud press assembly 20 is initially arranged as shown in FIG. 5 with the piston assembly 122 in its retracted position, the drive axis B aligned with the stud axis A, and the arm portions 82*a* and 82*b* arranged below the stud flange 32 and on either side of the head 40 of the stud 24 to be removed as shown in FIG. 8. The drive system 52 is then operated to displace the piston assembly 122 out of the drive cylinder 120 along the drive axis B until the piston rod 152 comes into contact with the stud shaft 42 and the arm portions 82*a* and 82*b* come into contact with the stud flange 32 as shown in FIG. 6. Continued operation of the drive system 52 forces the wheel stud 24 along the drive axis B until the unthreaded portion 46 of the wheel stud 24 is no longer within the stud opening 34. At this point, the wheel stud 24 should easily fall out of the stud opening 34.

Figure 9:
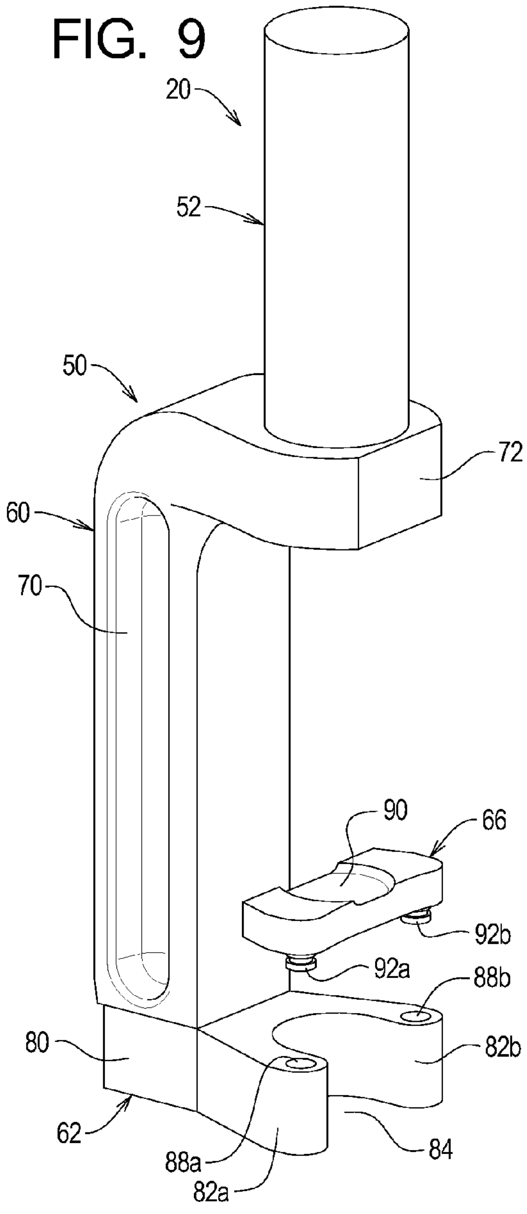
FIGS. 9 and 10 are perspective views illustrating the preparation of the first example wheel stud press assembly to insert a wheel stud.
Figure 10:
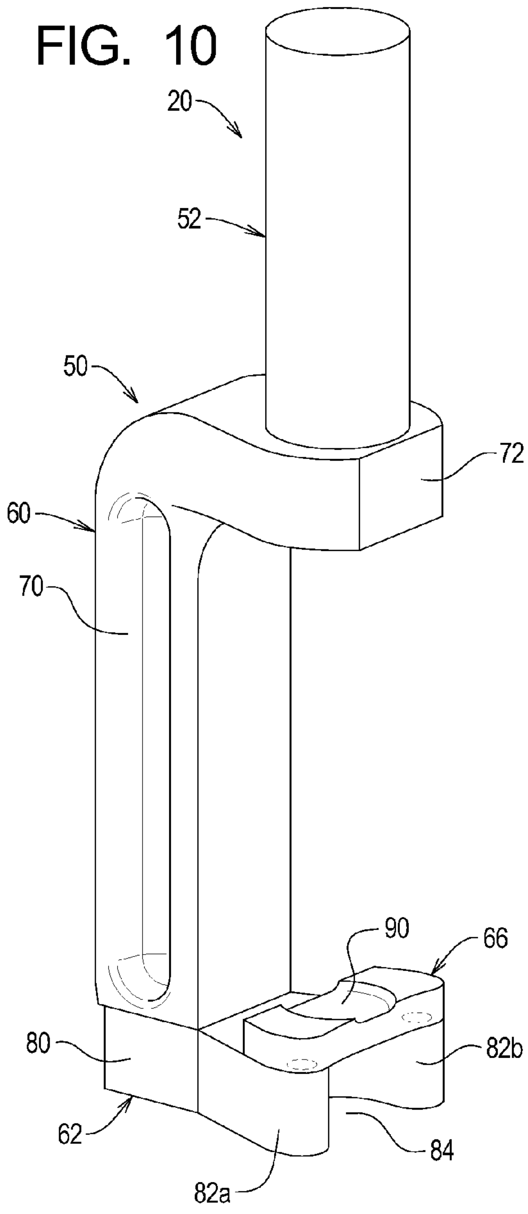

When used to insert a wheel stud, the brace plate 66 is initially mounted on the anchor member 62 as shown in FIG. 9 such that the brace plate 66 extends between the arm portions 82*a* and 82*b* as shown in FIG. 10. The wheel stud 24 to be inserted is then inserted through the desired stud opening 34 such that the unthreaded shaft portion 46 engages the portion of the stud flange 32 surrounding the desired stud opening 34 and the threaded shaft portion 44 extends on the other side of (typically above) the stud flange 32 from the unthreaded shaft portion 46 as shown in FIG. 11. The spacer 68 is then arranged such that the threaded shaft portion 44 is at least partly within the spacing chamber 96 as shown in FIGS. 11 and 12.

FIG. 12 also shows that the wheel stud press assembly 20 is arranged such that stud head 40 is at least partly within the stud recess 90 of the brace plate 66 and the end wall 98 of the spacer 68 is at least partly within the drive hole formed in the shoulder portion 72 of the frame member 60. At this point, the end of the spacer 68 opposite the end wall 98 engages the upper wall of the stud flange 32 and the drive axis B is aligned with the stud axis A. Operating the drive system 52 thus effectively applies a force on the stud head 40 that displaces the wheel stud 24 along the drive axis B relative to the stud flange 32 until the stud head 40 engages the stud flange 32 as shown in FIG. 13.

Figure 14:
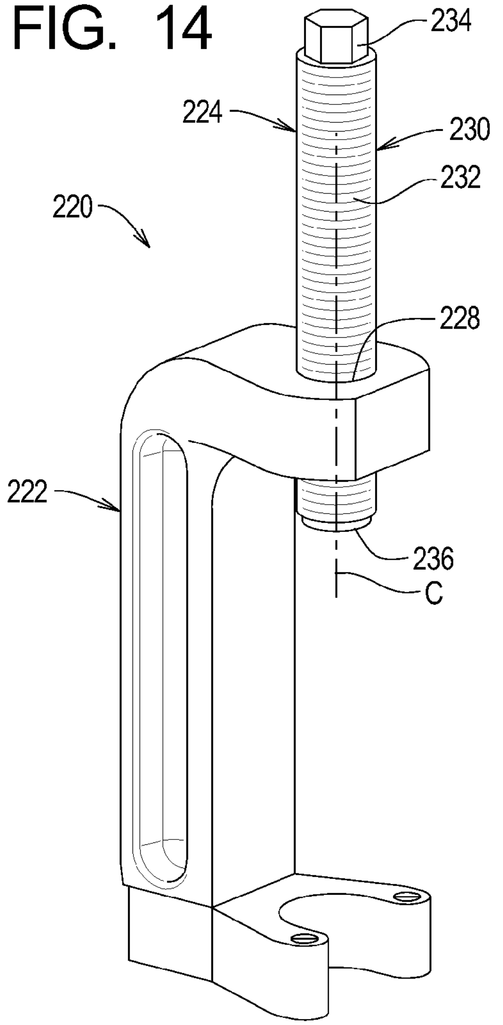
FIGS. 14 and 15 are perspective views of a second example wheel stud press assembly.
Figure 15:
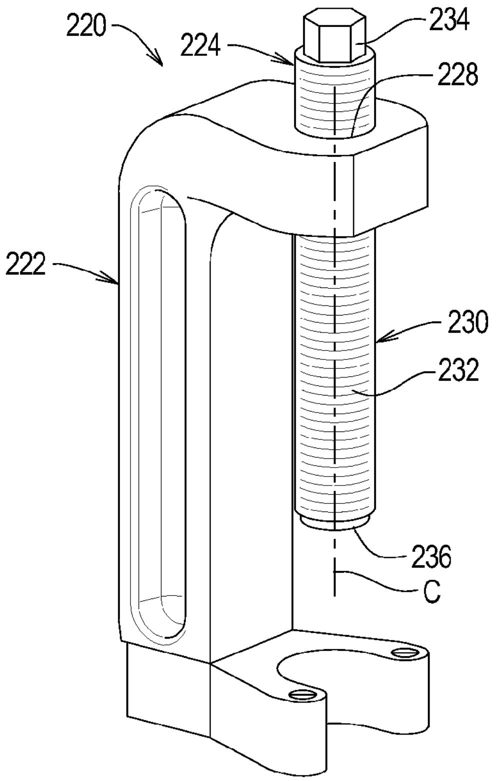

Referring now for a moment to FIGS. 14 and 15, depicted therein is a second example wheel stud press assembly 220 comprising the frame assembly 222 similar to the frame assembly 50 described above and a second example drive system 224 that is used in place of the first example drive system 52 described above.

The example frame assembly 222 is or may be the same as the example frame assembly 50 described above except that a drive hole 228 thereof is threaded. The second example drive system 222 comprises a drive rod 230 comprising a drive portion 232, a hex portion 234, and an engaging portion 236. The drive portion 232 is threaded to engage the threaded drive hole 228 such that axial rotation of the drive rod 230 relative to the frame assembly 222 causes linear movement of the drive rod 230 along a drive axis C defined by the drive hole 228. The hex portion 234 is adapted to engage a wrench (not shown), electric or pneumatic drill driver (not shown), or the like to facilitate axial rotation of the drive rod 230.

The second example wheel stud press assembly 220 is otherwise assembled and used in the same basic manner as the first example wheel stud press assembly 20, and such assembly and use will not be described herein again in detail.

The example wheel stud press assemblies 20 and 220 are designed for class 7/8 trucks but can also be used on wheel studs for mining trucks.

What is claimed is:

1. A wheel stud press assembly for displacing a wheel stud relative to a wheel opening in a wheel flange comprising:

a frame assembly defining a drive axis, the frame assembly comprising a frame member defining a main portion and a shoulder portion, an anchor member defining first and second arm portions, where the anchor member is detachably attached to the frame member; and a drive system comprising a drive rod, where the drive system is supported by the shoulder portion of the frame member to displace the drive rod along the drive axis; whereby the frame member is configured such that, when the anchor member is detachably attached to the frame member, the drive axis extends between the first and second arm portions, and is offset from the main portion of the frame member; and when the drive rod engages the wheel stud and the first and second arm portions engage the wheel flange, operation of the drive system forces the wheel stud out of the wheel opening between the first and second arm portions.

2. A wheel stud press assembly as recited in claim 1, in which:

the frame member further defines a threaded opening;

the drive rod defines a threaded surface; and the threaded surface engages the threaded opening such that axial rotation of the drive rod relative to the frame assembly displaces the drive rod along the drive axis.

3. A wheel stud press assembly as recited in claim 1, in which:

the drive system further comprises a drive cylinder supported by the frame member;

the drive cylinder supports the drive rod to define a drive chamber; and pressurized fluid within the drive chamber acts on the drive rod to displace the drive rod along the drive axis.

4. A wheel stud press assembly as recited in claim 1, in which the drive system further comprises at least one seal arranged to inhibit flow of pressurized fluid between the drive rod and the drive cylinder.

5. A wheel stud press assembly as recited in claim 1, in which:

the drive system further comprises a piston cap connected to the drive rod;

the piston cap is arranged to define a portion of the drive chamber; and pressurized fluid within the drive chamber acts on the drive rod through the piston cap.

6. A wheel stud press assembly as recited in claim 5, in which the drive system further comprises at least one seal supported by the piston cap to inhibit flow of pressurized fluid between the drive rod and the drive cylinder.

7. A wheel stud press assembly as recited in claim 5, in which:

the drive piston defines a first threaded surface;

the piston cap defines a second threaded surface; and the first threaded surface engages the second threaded surface to secure the piston cap to the drive piston.

8. A wheel stud press assembly as recited in claim 7, in which the drive system further comprises:

a first seal arranged to inhibit flow of pressurized fluid between the piston cap and the drive cylinder; and a second seal arranged to inhibit flow of pressurized fluid between the piston cap and the drive rod.

9. A wheel stud press assembly as recited in claim 3, further comprising a return spring for biasing the drive rod into a retracted position relative to the drive cylinder.

10. A wheel stud press assembly as recited in claim 1, further comprising:

a space plate adapted to extend between the first and second arm portions such that the drive axis extends through the space plate; and a spacer adapted to extend around a portion of the wheel stud; wherein when the space plate engages the wheel stud and the spacer engages the drive rod and the wheel flange, operation of the drive system causes the frame assembly to displace the space plate to force the wheel stud into the wheel opening.

11. A wheel stud press assembly for displacing a wheel stud relative to a wheel opening in a wheel flange comprising:

a frame assembly defining first and second arm portions and a drive axis, where the drive axis extends between the first and second arm portions;

a drive system comprising a drive cylinder and a drive rod, where the drive cylinder supports the drive rod to define a drive chamber and such that the drive rod is movably between retracted and extended positions relative to the drive cylinder; and the drive cylinder is supported by the frame assembly such that the drive rod moves along the drive axis when moved between the retracted and extended positions, and introduction of pressurized fluid into the drive chamber causes the drive rod to move from the retracted position to the extended position along the drive axis;

a space plate adapted to extend between the first and second arm portions such that the drive axis extends through the space plate; and a spacer adapted to extend around a portion of the wheel stud; whereby when the drive rod engages the wheel stud and the first and second arm portions engage the wheel flange, introduction of pressurized fluid into the drive chamber causes the drive rod to force the wheel stud out of the wheel opening between the first and second arm portions; and when the space plate engages the wheel stud and the spacer engages the drive rod and the wheel flange, introduction of pressurized fluid into the drive chamber causes the drive rod to force the wheel stud into the wheel opening.

12. A wheel stud press assembly as recited in claim 11, in which:

the drive system further comprises a piston cap connected to the drive rod;

the piston cap is arranged to define a portion of the drive chamber; and pressurized fluid within the drive chamber acts on the drive rod through the piston cap.

13. A wheel stud press assembly as recited in claim 12, in which the drive system further comprises at least one seal supported by the piston cap to inhibit flow of pressurized fluid between the drive rod and the drive cylinder.

14. A wheel stud press assembly as recited in claim 12, in which:

the drive piston defines a first threaded surface;

the piston cap defines a second threaded surface; and the first threaded surface engages the second threaded surface to secure the piston cap to the drive piston.

15. A wheel stud press assembly as recited in claim 14, in which the drive system further comprises:

a first seal arranged to inhibit flow of pressurized fluid between the piston cap and the drive cylinder; and a second seal arranged to inhibit flow of pressurized fluid between the piston cap and the drive rod.

16. A wheel stud press assembly as recited in claim 11, further comprising a return spring for biasing the drive rod into the retracted position.

17. A wheel stud press assembly as recited in claim 11, in which the frame assembly comprises:

a frame member, and an anchor member defining first and second arm portions, where the anchor member is detachably attached to the frame member such that the drive axis extends between the first and second arm portions.

18. A wheel stud press assembly for displacing a wheel stud relative to a wheel opening in a wheel flange comprising:

a frame assembly defining first and second arm portions and a drive axis, where the drive axis extends between the first and second arm portions;

a drive system comprising a drive rod and a drive cylinder supported by the frame assembly, where the drive cylinder supports the drive rod to define a drive chamber, and pressurized fluid within the drive chamber acts on the drive rod to displace the drive rod along the drive axis, where the drive system is supported by the frame assembly to displace the drive rod along the drive axis; whereby when the drive rod engages the wheel stud and the first and second arm portions engage the wheel flange, operation of the drive system forces the wheel stud out of the wheel opening between the first and second arm portions.

19. A wheel stud press assembly as recited in claim 18, in which the drive system further comprises at least one seal arranged to inhibit flow of pressurized fluid between the drive rod and the drive cylinder.

20. A wheel stud press assembly as recited in claim 18, in which:

the drive system further comprises a piston cap connected to the drive rod;

the piston cap is arranged to define a portion of the drive chamber; and pressurized fluid within the drive chamber acts on the drive rod through the piston cap.

21. A wheel stud press assembly as recited in claim 20, in which the drive system further comprises at least one seal supported by the piston cap to inhibit flow of pressurized fluid between the drive rod and the drive cylinder.

22. A wheel stud press assembly as recited in claim 20, in which:

the drive piston defines a first threaded surface;

the piston cap defines a second threaded surface; and the first threaded surface engages the second threaded surface to secure the piston cap to the drive piston.

23. A wheel stud press assembly as recited in claim 22, in which the drive system further comprises:

a first seal arranged to inhibit flow of pressurized fluid between the piston cap and the drive cylinder; and a second seal arranged to inhibit flow of pressurized fluid between the piston cap and the drive rod.

24. A wheel stud press assembly as recited in claim 18, further comprising a return spring for biasing the drive rod into a retracted position relative to the drive cylinder.

25. A wheel stud press assembly as recited in claim 18, further comprising:

a space plate adapted to extend between the first and second arm portions such that the drive axis extends through the space plate; and a spacer adapted to extend around a portion of the wheel stud; wherein when the space plate engages the wheel stud and the spacer engages the drive rod and the wheel flange, operation of the drive system causes the frame assembly to displace the space plate to force the wheel stud into the wheel opening.

* * * * *